US012586384B2

(12) United States Patent
Verkin et al.

(10) Patent No.: US 12,586,384 B2
(45) Date of Patent: Mar. 24, 2026

(54) METHOD AND DEVICE FOR CAMERA-BASED DETERMINATION OF A DISTANCE OF A MOVING OBJECT IN THE SURROUNDINGS OF A MOTOR VEHICLE

(71) Applicant: Volkswagen Aktiengesellschaft, Wolfsburg (DE)

(72) Inventors: Julian Verkin, Hennigsdorf (DE); Robert Dreyer, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 1034 days.

(21) Appl. No.: 17/625,987

(22) PCT Filed: Jun. 25, 2020

(86) PCT No.: PCT/EP2020/067964
§ 371 (c)(1),
(2) Date: Jan. 10, 2022

(87) PCT Pub. No.: WO2021/004810
PCT Pub. Date: Jan. 14, 2021

(65) Prior Publication Data
US 2022/0366587 A1     Nov. 17, 2022

(30) Foreign Application Priority Data

Jul. 11, 2019    (DE) ..................... 10 2019 210 300.6

(51) Int. Cl.
*G06V 20/58* (2022.01)
*G01S 17/08* (2006.01)
(Continued)

(52) U.S. Cl.
CPC .............. *G06V 20/58* (2022.01); *G01S 17/08* (2013.01); *G01S 17/89* (2013.01); *G06T 7/20* (2013.01);
(Continued)

(58) Field of Classification Search
CPC .. G06T 7/579; G06T 7/20; G06T 7/60; G06T 2207/30252; G06T 7/251; G06T 7/246;
(Continued)

(56) References Cited

U.S. PATENT DOCUMENTS 9,176,221 B2    11/2015  Schweid et al.
2007/0127779 A1   6/2007  Miyahara ...................... 382/106
(Continued)

FOREIGN PATENT DOCUMENTS

CN        103180877 A      6/2013
CN        106197382 A   * 12/2016   ............. G01C 11/08
(Continued)

OTHER PUBLICATIONS

German Office Action, Application No. 102019210300.6, 4 pages.
(Continued)

*Primary Examiner* — Gregory A Morse
*Assistant Examiner* — Rohan Tejas Mukundhan
(74) *Attorney, Agent, or Firm* — Slayden Grubert Beard PLLC

(57) ABSTRACT

Disclosed is a method for camera-based determination of distance of a moving object in the surroundings of a vehicle, wherein surroundings images of the surroundings are captured using a camera, wherein the moving object and at least one stationary object are identified in the surroundings images and a stationary object is selected using a distinguished geometric relationship, wherein an image size ratio between the moving object and the stationary object is determined, wherein an image size of the stationary object
(Continued)

in the second surroundings image is determined, wherein distances of the stationary object and an object size of the stationary object are determined on the basis of the determined image sizes of the stationary object and a vehicle speed, and wherein distances of the moving object are determined on the basis of the determined image size ratio, the determined distances and the determined object size of the stationary object.

21 Claims, 2 Drawing Sheets

(51) Int. Cl.

| | | |
|---|---|---|
| *G01S 17/89* | (2020.01) | |
| *G06T 7/20* | (2017.01) | |
| *G06T 7/579* | (2017.01) | |
| *G06T 7/60* | (2017.01) | |

(52) U.S. Cl.
CPC ................ *G06T 7/579* (2017.01); *G06T 7/60* (2013.01); *G06T 2207/30252* (2013.01)

(58) Field of Classification Search
CPC ......... G06T 7/248; G06V 20/58; G01S 17/04; G01S 17/06; G01S 17/08; G01S 17/46; G01S 17/50; G01S 17/89
See application file for complete search history.

(56) References Cited

U.S. PATENT DOCUMENTS

| | | | | |
|---|---|---|---|---|
| 2013/0057846 A1 | 3/2013 | Mählisch et al. | ............ | 356/4.07 |
| 2014/0072176 A1 | 3/2014 | Orecher | ........................ | 382/103 |
| 2014/0085428 A1 | 3/2014 | Stählin | ........................... | 348/46 |
| 2018/0211394 A1 | 7/2018 | Sergeev | | |
| 2019/0064323 A1 | 2/2019 | Mayer et al. | | |

FOREIGN PATENT DOCUMENTS

| | | | | |
|---|---|---|---|---|
| CN | 106197382 B | 6/2018 | | |
| DE | 102006057552 A1 | 6/2007 | | |
| DE | 102010049216 A1 | 7/2011 | | |
| DE | 102010013815 A1 | 10/2011 | | |
| DE | 102011075674 A1 | 11/2012 | | |
| DE | 102011076112 A1 | 11/2012 | | |
| DE | 102011055441 A1 | 5/2013 | | |
| DE | 102012211396 A1 | 4/2014 | | |
| DE | 102015112289 A1 | 2/2017 | | |
| DE | 102016013503 A1 | 5/2017 | | |
| DE | 102019210300 A1 | 1/2021 | | |
| EP | 2202601 A2 | 6/2010 | | |
| EP | 2568313 A1 | 3/2013 | | |
| EP | 3451021 A1 | 3/2019 | | |
| JP | 3747863 B2 * | 2/2006 | | |
| WO | WO-2018225480 A1 * | 12/2018 | ............. | G01C 21/28 |
| WO | 2021/004810 A1 | 1/2021 | | |

OTHER PUBLICATIONS

International Search Report and Written Opinion, Application No. PCT/EP2020/067964, 9 pages.
Chinese Office Action, Application No. 202080050409.8, 8 pages.

\* cited by examiner

METHOD AND DEVICE FOR CAMERA-BASED DETERMINATION OF A DISTANCE OF A MOVING OBJECT IN THE SURROUNDINGS OF A MOTOR VEHICLE

CROSS-REFERENCE TO RELATED APPLICATIONS

This application claims priority to German Patent Application No. DE 10 2019 210 300.6, filed on Jul. 11, 2019 with the German Patent and Trademark Office. The contents of the aforesaid patent application are incorporated herein for all purposes.

TECHNICAL FIELD

The invention relates to a method and a device for camera-based determination of a distance of a moving object in the surroundings of a motor vehicle. The invention further relates to a motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In modern motor vehicles, cameras are used to capture surroundings of the motor vehicle. For three-dimensional capture, a plurality of cameras is required to generate a stereoscopic image of the surroundings.

CN 106197382 B discloses a method for dynamically determining a distance of a target with a vehicle single camera. However, the method may only be applied to stationary objects.

SUMMARY

A need exists to provide a method and a device for camera-based determination of a distance of a moving object in the surroundings of a motor vehicle.

The need is addressed by a method and a device having the features of the independent claims. Embodiments of the invention are described in the dependent claims, the following description, and the drawings.

DESCRIPTION

Figure 1:
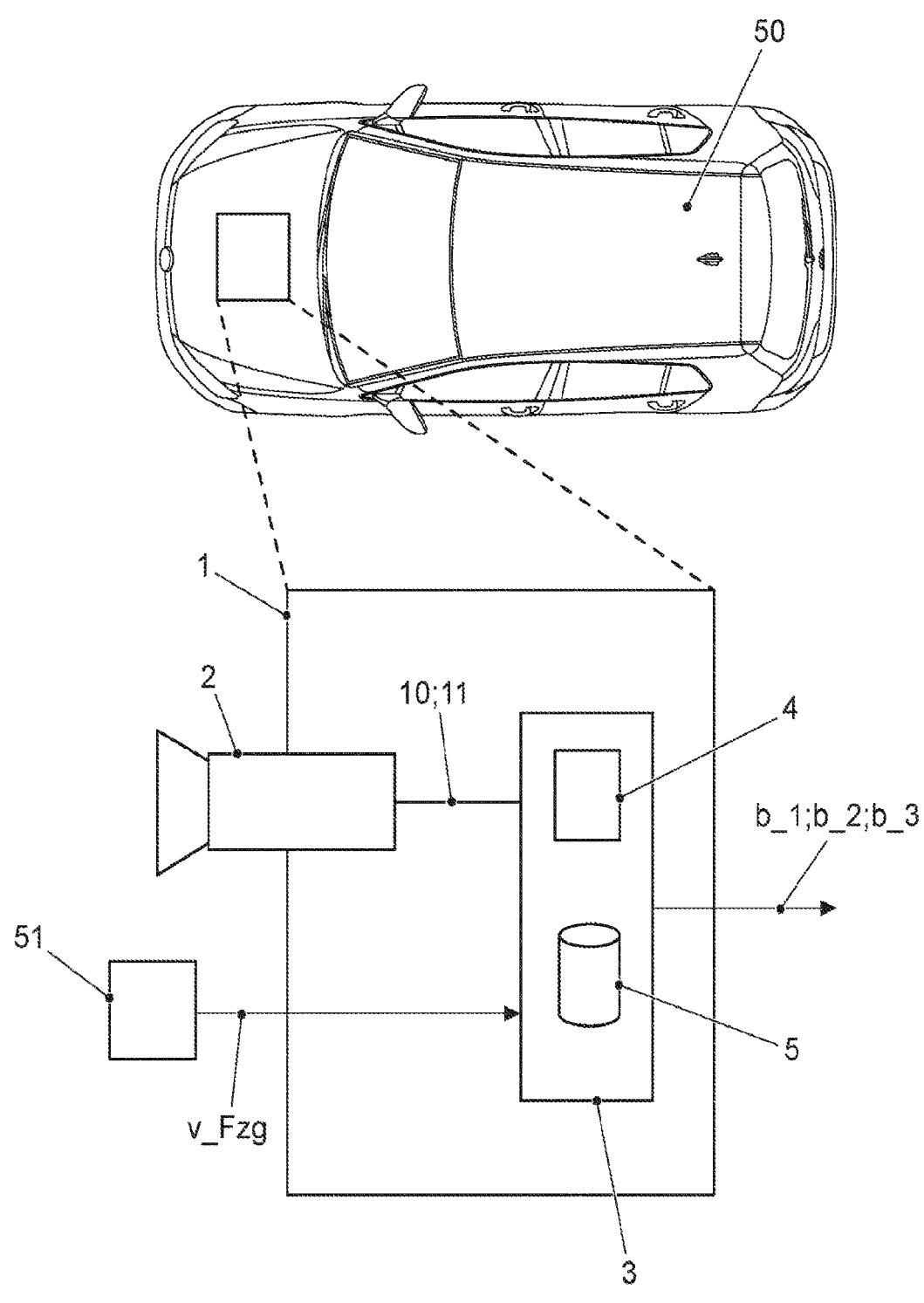
FIG. 1 shows a schematic representation of an embodiment of a device for camera-based determination of a distance of a moving object in the surroundings of a motor vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for camera-based determination of a distance of a moving object in the surroundings of a motor vehicle is provided, wherein a first surroundings image of the surroundings at a first time and a second surroundings image of the surroundings at a subsequent second time are captured by means of a camera, wherein the moving object is identified in the captured surroundings images and wherein at least one stationary object is identified in the captured surroundings images and is selected according to a distinguished geometric relationship relative to the moving object in the first surroundings image, wherein an image size ratio between an image size of the moving object and an image size of the stationary object is determined in the first surroundings image, wherein an image size of the stationary object is determined in the second surroundings image, wherein distances of the stationary object at the first time and at the second time and an object size of the stationary object are determined on the basis of the determined image sizes of the stationary object and a vehicle speed, and wherein distances of the moving object at the first time and at the second time are determined and provided on the basis of the determined image size ratio, the determined distances and the determined object size of the stationary object.

Furthermore, a device for camera-based determination of a distance of a moving object in the surroundings of a motor vehicle is provided in some embodiments, comprising a camera for capturing the surroundings, and an evaluation apparatus, wherein the camera is designed to capture a first surroundings image of the surroundings at a first time and a second surroundings image of the surroundings at a subsequent second time, and wherein the evaluation apparatus is designed to identify the moving object in the captured surroundings images and to further identify at least one stationary object in the captured surroundings images and to select said stationary object in the captured surroundings images according to a distinguished geometric relationship relative to the moving object in the first surroundings image, to determine an image size ratio between an image size of the moving object and an image size of the stationary object in the first surroundings image, and further determine an image size of the stationary object in the second surroundings image, determine distances of the stationary object at the first time and at the second time and an object size of the stationary object on the basis of the determined image sizes of the stationary object and a vehicle speed, and to determine and provide distances of the moving object at the first time and at the second time on the basis of the determined image size ratio, the determined distances and the determined object size of the stationary object.

The method and the device make it possible to determine a distance of a moving object exclusively on the basis of two surroundings images which have been captured by a single camera at successive times. It is assumed here that the camera, in particular together with a motor vehicle, is moved relative to the surroundings between the first time and the second time. The moving object, which is, for example, a motor vehicle traveling ahead, is identified in the captured surroundings images. Furthermore, at least one stationary object is identified in the captured surroundings images and selected according to a distinguished geometric relationship relative to the moving object in the first surroundings image. In this case, the identification and selection comprise in particular the identification of a plurality of stationary objects in the surroundings of the motor vehicle. After a plurality of stationary objects have been identified in the surroundings, a suitable stationary object is selected according to a distinguished geometric relationship relative to the moving object in the first surroundings image.

The following method steps are carried out with the selected stationary object. An image size ratio between an image size, that is to say a number of image elements, for example in the horizontal or in the vertical direction (i.e., with respect to a width or height) of the moving object, and an image size of the stationary object in the first surroundings image is determined. In particular, an image dimension (i.e., a width measured in terms of image elements or a height measured in terms of image elements) is considered here separately. However, it is also possible for the two image dimensions to be considered and, for example, an average value of an image size ratio to be calculated which is determined in each case for a width and a height. In the case of a known size of an image element, the number of image elements may also be converted into a corresponding physical quantity (size of the image on the camera sensor). Subsequently, an image size of the stationary object in the second surroundings image is determined in the same way.

On the basis of the determined image sizes of the stationary object and a vehicle speed, which is requested from a vehicle odometry system of the motor vehicle, for example, by means of the evaluation apparatus, distances of the stationary object from the motor vehicle or from the camera at the first time and at the second time as well as an object size of the stationary object are determined. In the last step, distances of the moving object at the first time and at the second time are determined and provided on the basis of the determined image size ratio, the determined distances of the stationary object and the determined object size of the stationary object.

In other words, the selected stationary object is used as a reference object, for which distances from the camera or motor vehicle at the two times are determined with the aid of known imaging conditions of the camera and a known distance traveled. Since the stationary object has been selected according to a distinguished geometric relationship relative to the moving object in the first surroundings image, the corresponding distances of the moving object at the first time and at the second time may be determined from the determined image size ratio of the moving object and the stationary object in the first surroundings image and the determined distances of the stationary object, taking into account the distinguished geometric relationship.

The benefits of the teachings herein are that a distance from a moving object may be determined by means of a single camera. Since only a single camera is required, costs and installation space may be spared.

The camera is in particular a mono camera or single camera, that is to say a camera which captures the surroundings from only one direction or with a single objective. In this case, the camera is arranged in particular on a motor vehicle and captures a region in front of or behind the motor vehicle. The camera is moved together with the motor vehicle during the capture of the first surroundings image and the second surroundings image, such that at least one distance between the motor vehicle or the camera and the stationary object changes and at least one image size of the stationary object changes. If the camera captures a region behind the motor vehicle, reverse travel may thereby be monitored, for example, or a different motor vehicle approaching from behind may be identified before an overtaking maneuver.

The moving object and the stationary object are identified in the captured surroundings images by means of methods known per se for pattern recognition. In this case, for example, methods of machine learning may be used. It may be specified as to which type of objects in the captured surroundings images are to be identified or searched for. For example, it may be specified that the moving object is a motor vehicle traveling ahead.

The selection of the stationary object according to a distinguished geometric relationship relative to the moving object in the first surroundings image is in particular to comprise the selection of a stationary object which is arranged in a favorable manner relative to the moving object. In particular, the distinguished geometric relationship here describes the condition that the stationary object is arranged in the immediate vicinity of the moving object owing to a proximity to the moving object or at least partially contacts the moving object. This is based on the fact that, in the case of immediate proximity or in the case of contact, a size of the moving object and a size of the stationary object are comparable at least in this immediate vicinity or at contact points, such that inferences may be made about dimensions of the moving object from the dimensions of the stationary object. In the case of contact or immediate proximity, in particular a distance, that is to say a distance from the camera, of the moving and stationary object is the same. An always present contact point of the motor vehicle with a road is particularly suitable for this purpose. As a result of the distinguished geometric relationship, the determined image sizes and thus also the real sizes of the objects are therefore at least partially directly comparable to one another.

The method steps for determining the distances of the moving object are carried out in particular by means of the evaluation apparatus. Parts of the evaluation apparatus may be designed separately or collectively as a combination of hardware and software, for example as program code which is executed on a microcontroller or microprocessor. However, it is also possible for the parts to be designed separately or collectively as an application-specific integrated circuit (ASIC).

It is possible for the method to be repeated cyclically. In particular, the method may be repeated for pairs of surroundings images captured each at different, in particular adjacent, times. In this way, a distance for the moving object may be determined repeatedly. In the case of repeated execution, a change in the relative speed may be established, in particular by means of a changed distance (and a relative speed which may be ascertained therefrom), and thus a braking or acceleration of the moving object (e.g. of a vehicle traveling ahead) may be inferred according to a speed or change in speed of the motor vehicle, whereupon a driver assistance system may respond accordingly.

It is possible for the method to be carried out for a plurality of moving objects on the basis of the first captured surroundings image and the second captured surroundings image. In this case, the method steps for each of the moving objects are carried out separately. However, it is also possible for the same selected stationary object to be used for a plurality of moving objects.

In some embodiments, an object size of the moving object is determined on the basis of the determined image size ratio and the determined object size of the stationary object, wherein a further distance of the moving object at a further later time is determined exclusively on the basis of the determined object size and an image size of the moving object determined in a captured further surroundings image. As a result, after a single determination of the object size of the moving object, a distance from the moving object may be determined in further images captured later. After the single determination of the object size, resources may thereby be spared since the remaining method steps no longer have to be carried out.

In some embodiments, the distances and/or the object size of the stationary object are determined on the basis of known optical properties of the camera, assuming a fixed focus optical unit with a known image distance. A determination of the distances and the object size of the stationary object may thus be carried out in a particularly simple manner with low computational effort.

The same principle may also be applied to cameras with adjustable focusing, wherein the image distances are determined for this purpose, e.g., ascertained from captured camera data.

In some embodiments, the distinguished geometric relationship is defined by at least one contact point of image elements of the moving object and image elements of the stationary object in the first surroundings image. If the moving object is, for example, a motor vehicle traveling ahead, contact points of the motor vehicle traveling ahead with a road surface, for example contact lines of rear wheels with the road surface, may be identified in the first surroundings image and used to define the geometric relationship. In other words, it may be assumed at these points that the real dimensions at the contact points between the motor vehicle and the road are the same since they have the same distance from the camera in this respect. For example, a road lane width derived or determined or estimated at these contact points via road markings may be used as a stationary object.

In some embodiments, a relative speed of the moving object with respect to the motor vehicle is determined and provided on the basis of the determined distances of the moving object and a time difference between the first time and the second time. In this way, state information about a dynamic state of the moving object may additionally be provided.

In some embodiments, an absolute speed of the moving object is determined and provided, wherein for this purpose the determined relative speed and a vehicle speed of the motor vehicle are added together. The vehicle speed of the motor vehicle may be requested from a vehicle odometry system, for example, by means of the evaluation apparatus. As a result, an absolute value for the dynamic state of the moving object may additionally also be provided. Furthermore, an acceleration or a deceleration of the moving object may be calculated from a plurality of absolute speeds determined for successive times.

Features for configuring the device are apparent from the description of embodiments of the method. The benefits of the device in this context are always the same as the embodiments of the method.

A motor vehicle is also provided, comprising at least one device according to any of the described embodiments.

In the following, the invention is explained in greater detail based on further exemplary embodiments and with reference to the drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation of an embodiment of the device 1 for camera-based determination of a distance of a moving object in the surroundings of a motor vehicle 50. The device 1 is arranged in the motor vehicle 50. The device 1 comprises a single camera 2 and an evaluation apparatus 3.

Parts of the evaluation apparatus 3 may be designed separately or collectively as a combination of hardware and software, for example as program code which is executed on a microcontroller or microprocessor. However, it is also possible for the parts to be designed separately or collectively as an application-specific integrated circuit (ASIC). The evaluation apparatus 3 comprises in particular a computing apparatus 4, for example in the form of a microprocessor, and a memory 5, in which the computing apparatus 4 may perform computational operations.

The camera 2 captures a first surroundings image 10 of the surroundings at a first time and a second surroundings image 11 of the surroundings at a subsequent second time and supplies the captured surroundings images 10, 11 to the evaluation apparatus 3. The motor vehicle 50 and the camera 2, together therewith, are moved between the two times. In particular, it is possible for the camera 2 to capture a stream of surroundings images in the form of a video, and the first surroundings image 10 and the second surroundings image 11 are taken as individual images from the video stream.

The evaluation apparatus 3 identifies the moving object, from which the distance is to be determined, in the captured surroundings images 10, 11. The moving object may be, for example, a motor vehicle traveling ahead. Furthermore, the evaluation apparatus 3 identifies stationary objects in the captured surroundings images 10, 11 and selects one of these stationary objects according to a distinguished geometric relationship relative to the moving object in the first surroundings image 10. In particular, the distinguished geometric relationship may be an identical image plane in the first surroundings image 11, that is to say a same distance at least of parts of the moving object and of the stationary object from the camera 2. For example, image elements of a motor vehicle traveling ahead, for example of rear tires, may adjoin image elements of the stationary object, for example a road or a road marking. From the context (motor vehicle traveling ahead+road+rear tire), an inference may be made that the moving object and the stationary object in this image plane, that is to say at the location of the image elements adjoining one another, have the same distance from the camera or from the motor vehicle 50.

The evaluation apparatus 3 then determines an image size ratio between an image size of the moving object and an image size of the stationary object in the first surroundings image 10. For this purpose, for example, a number of image elements (pixels) in the surroundings image 10 is determined for a height and/or a width of the objects. The image size ratio of the two objects relative to one another in the first surroundings image 10 may be determined from the two values for the number of image elements.

In the second surroundings image 11, the evaluation apparatus 3 likewise determines an image size of the stationary object.

The evaluation apparatus 3 determines distances of the stationary object at the first time and at the second time and an object size of the stationary object on the basis of the image sizes of the stationary object determined in the surroundings images 10, 11 and a vehicle speed v_Fzg. The vehicle speed v_Fzg is supplied to the evaluation apparatus 3, for example, from a vehicle odometry system 51 of the motor vehicle 50 and/or requested from said vehicle odometry system.

In the last step, the evaluation apparatus 3 determines distances b_1, b_2 of the moving object at the first time and at the second time on the basis of the determined image size ratio, the determined distances and the determined object size of the stationary object. The determined distances b_1, b_2 are then provided for further processing and output for this purpose in the form of a digital data packet, for example.

It is possible for an object size of the moving object to be determined by the evaluation apparatus 3 on the basis of the determined image size ratio and the determined object size of the stationary object, wherein a further distance b_3 of the moving object is determined at a later further time exclusively on the basis of the determined object size and an image size of the moving object determined in a captured further surroundings image.

Figure 2:
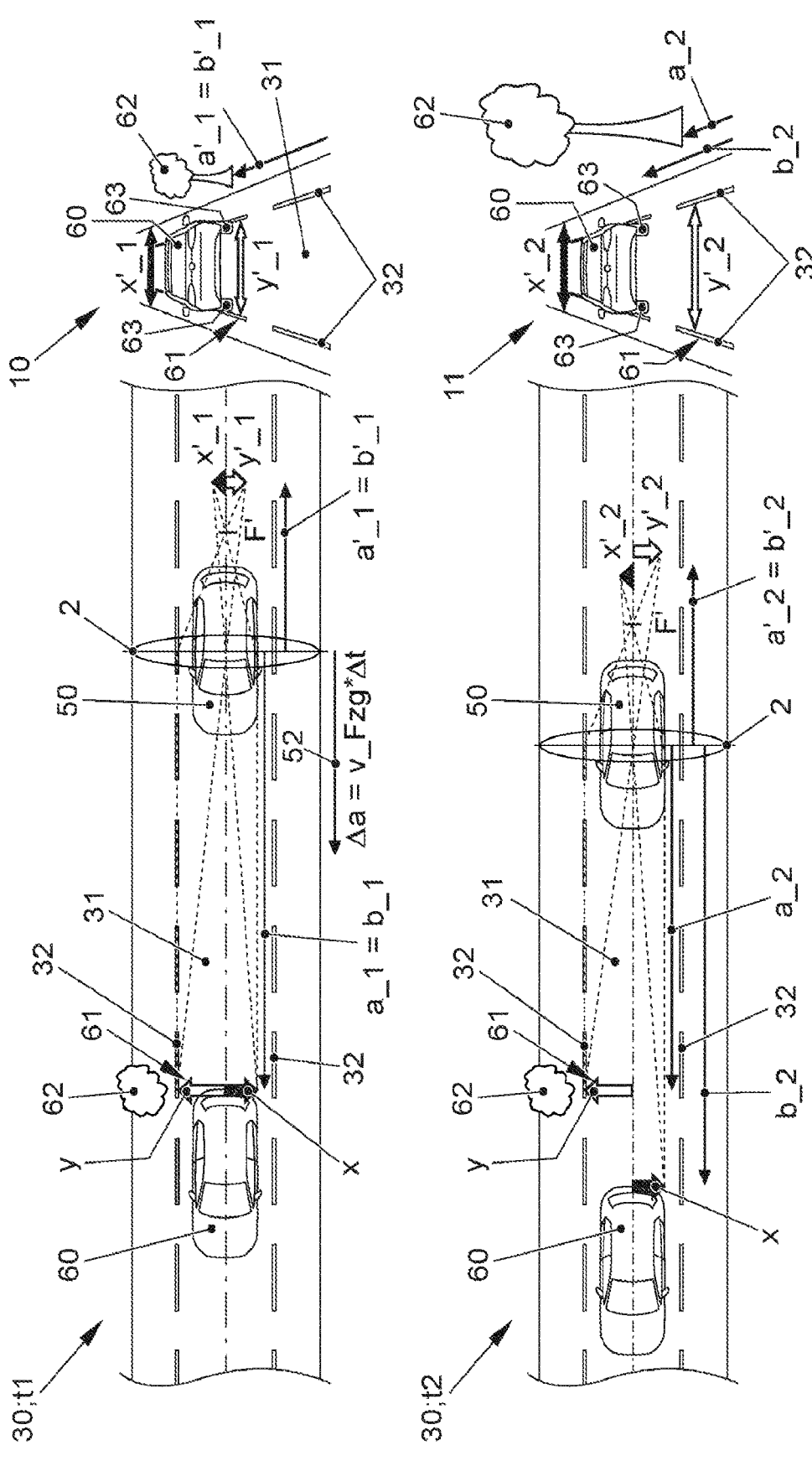
FIG. 2 shows a schematic representation of an exemplary surroundings at the first time and at the second time.

FIG. 2 shows a schematic representation of an exemplary surroundings 30 at the first time t1 and at the subsequent second time t2 to illustrate the teachings herein. A plan view of the surroundings 30 is shown on the left-hand side of FIG. 2. A schematic representation of each of the captured surroundings images 10, 11 is shown on the right-hand side in FIG. 2.

The surroundings 30 of the motor vehicle 50 comprise a moving object 60 and a stationary object 61 in each case. The moving object 60 has a size x and the stationary object 61 has a size y, wherein the sizes x, y in the example shown relate to a width of the objects 60, 61 with respect to a viewing direction from the motor vehicle 50. For the sake of clarity, only half the width is shown here in plan view. In addition, a tree 62 is also shown as a stationary object, but this is used only to illustrate the change in the image sizes. In principle, however, the tree 62 could also be selected as a stationary object.

Individual steps of the method are explained in more detail below. It is assumed here that the camera 2 is arranged in a center of the motor vehicle 50 and the camera 2 captures the surroundings 30 in the direction of travel 52.

The steps described below are carried out in the evaluation apparatus 3 (FIG. 1).

In one step, the moving object 60, in the present case a motor vehicle traveling ahead, is identified in the first captured surroundings image 10. An image size x'_1 of the moving object is ascertained, wherein for this purpose a number of image elements which the moving object 60 occupies over a width (alternatively over a height) in the first surroundings image 10 is determined.

In a subsequent step, stationary objects are identified in the first surroundings image 10 and a stationary object 61 in the first surroundings image 10 is selected on the basis of a suitable geometric relationship with respect to the moving object 60. In the example shown, the geometric relationship is, for example, one or more contact point(s) of the rear wheels 63 of the motor vehicle traveling ahead in the lane 31. In the example shown, a part of the lane 31 is selected as the stationary object 61 or its width at this position, which is defined by a distance of associated lane markings 32. At the contact points, the dimensions of the moving object 60 and of the stationary object 61 in the first surroundings image 10 may be compared directly with one another since a distance a_1, b_1 from the camera 2 is the same. In this step, an image size y'_1 of the stationary object 61 is also determined. The image size is determined via a number of image elements (pixels) which the stationary object 61 occupies in the first surroundings image 10 with respect to a width (alternatively height). In the case of a known size of an image element, the number of image elements may then also be converted into a corresponding physical quantity (size of the image on the camera sensor).

Subsequently, an image size ratio k between the moving object 60 and the stationary object 61 in the first surroundings image 10 is determined. This is done by comparing the number of image elements determined in each case:

$$k=x'\_1/y'\_1$$

After a known time period Δt (difference between the first time and the second time) and a known traveled distance Δa=v_Fzg*Δt in the direction of travel 52, the following steps are carried out by means of the evaluation apparatus 3 (FIG. 1).

In the second captured surroundings image 11, an image size y'_2 of the stationary object 61, that is to say the lane or its width at the corresponding position, is determined.

The distances a_1, a_2 and an object size y of the stationary object 61 are then determined. In this case, a fixed focus optical unit of the camera 2 is assumed with known properties.

According to the geometric optical unit, it is the case that:

$$y'\_1/y=a'\_1/a\_1 \text{ and } y'\_2/y=a'\_2/a\_2$$

The distance traveled may be determined with a known Δt using the vehicle speed v_Fzg of the motor vehicle 50 (or the camera 2):

$$\Delta a=v\_Fzg*\Delta t=a\_1-a\_2$$

From this and using an approximation of a fixed focus optical unit with a known image distance:

$$a'=a'\_1=b'\_1\approx a'\_2\approx b'\_2$$

it follows that $$y'\_1*a\_1=y'\_2(a\_1-\Delta a)$$

Rearranged, this gives:

$$a\_1=y'\_2*\Delta a/(y'\_2-y'\_1)$$

and $$a\_2=a\_1-\Delta a$$

$$y=(a\_1/a')*y'\_1=(a\_2/a')*y'\_2$$

In a subsequent step, the evaluation apparatus 3 (FIG. 1) calculates the size x of the moving object 60 using the known image size ratio k:

$$x=k*y$$

The distances b_1 and b_2 may then be determined in this way:

$$b\_1=a\_1$$

$$b\_2=(x/x'\_2)*a$$

It is possible for a relative speed v_Obj_rel of the moving object 60 with respect to the motor vehicle 50 to be determined and provided on the basis of the determined distances b_1, b_2 of the moving object 60 and the time difference Δt between the first time t1 and the second time t2:

$$v\_Obj\_rel=(b\_2-b\_1)/\Delta t$$

Furthermore, according to one embodiment, an absolute speed v_Obj_abs of the moving object 60 is determined and provided, wherein for this purpose the determined relative speed v_Obj_rel and a vehicle speed v_Fzg of the motor vehicle 50 are added together:

$$v\_Obj\_abs = v\_Obj\_rel + v\_Fzg$$

The method and the device make it possible to determine a distance from a moving object in a simple manner using a single camera. In this case, the method may be repeated cyclically for further times. Furthermore, it is possible for the method to be carried out for further moving objects in the surroundings of the motor vehicle 50.

LIST OF REFERENCE NUMERALS

1 Device
2 Camera
3 Evaluation apparatus
4 Computing apparatus
5 Memory
10 First surroundings image
11 Second surroundings image
30 Surroundings
31 Lane
32 Lane marking
50 Motor vehicle
51 Vehicle odometry system
52 Direction of travel
60 Moving object
61 Stationary object
62 Tree
63 Rear wheel
t1 First time
t2 Second time
x Size (moving object)
y Size (stationary object)
x'_1 Image size (moving object, first time)
x'_2 Image size (moving object, second time)
y'_1 Image size (stationary object, first time)
y'_2 Image size (stationary object, second time)
k Image size ratio
a_1 Distance (stationary object, first time)
a_2 Distance (stationary object, second time)
b_1 Distance (moving object, first time)
b_2 Distance (moving object, second time)
b_3 Further distance (moving object, further time)
v_Fzg Vehicle speed
v_Obj_rel Relative speed (moving object)
v_Obj_abs Absolute speed (moving object)
Δt Time difference
Δa traveled distance The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for camera-based determination of a distance of a moving object in the surroundings of a motor vehicle, comprising:
   capturing a first surroundings image of the surroundings at a first time and a second surroundings image of the surroundings at a subsequent second time using a camera;
   identifying the moving object in the captured surroundings images;
   identifying at least one stationary object in the captured surroundings images and selecting the at least one stationary object according to a distinguished geometric relationship relative to the moving object in the first surroundings image, wherein the distinguished geometric relationship denotes a condition wherein the stationary object is arranged in the immediate vicinity or in contact with the moving object;
   determining an image size ratio between an image size of the moving object and an image size of the stationary object in the first surroundings image, wherein determining the image size ratio comprises determining a first number of image elements in the first surroundings image for a height and/or a width of the moving object and a second number of image elements in the first surroundings image for a height and/or a width of the stationary object and determining the image size ratio based on the first number of image elements and the second number of image elements;
   determining an image size of the stationary object in the second surroundings image;
   determining distances of the stationary object at the first time and at the second time and an object size of the stationary object on the basis of the determined image sizes of the stationary object and a vehicle speed; and
   determining distances of the moving object at the first time and at the second time on the basis of the determined image size ratio, the determined distances and the determined object size of the stationary object.

2. The method of claim 1, comprising determining an object size of the moving object on the basis of the determined image size ratio and the determined object size of the stationary object, and calculating a further distance of the moving object at a later further time only on the basis of the determined object size and an image size of the moving object determined in a captured third surroundings image.

3. The method of claim 1, comprising determining one or more of the distances and the object size of the stationary object on the basis of predefined optical properties of the camera, wherein the camera comprises a fixed focus optical unit with a predefined image distance.

4. The method of claim 1, wherein the distinguished geometric relationship is defined by at least one contact point of image elements of the moving object and image elements of the stationary object in the first surroundings image.

5. The method of claim 1, comprising determining and providing a relative speed of the moving object with respect to the motor vehicle on the basis of the determined distances of the moving object and a time difference between the first time and the second time.

6. The method of claim 5, comprising determining and providing an absolute speed of the moving object, wherein for this purpose the determined relative speed and a vehicle speed of the motor vehicle are added together.

7. A device for camera-based determination of a distance of a moving object in the surroundings of a motor vehicle, comprising:
    a camera for capturing the surroundings; and
    an evaluation circuit;
        wherein the camera is configured to capture a first surroundings image of the surroundings at a first time and a second surroundings image of the surroundings at a subsequent second time; and wherein the evaluation circuit is configured:
            to identify the moving object in the captured surroundings images;
            to identify at least one stationary object in the captured surroundings images and to select said stationary object in the captured surroundings images according to a distinguished geometric relationship relative to the moving object in the first surroundings image;
            to determine an image size ratio between an image size of the moving object and an image size of the stationary object in the first surroundings image;
            to determine an image size of the stationary object in the second surroundings image, wherein determining the image size ratio comprises determining a first number of image elements in the first surroundings image for a height and/or a width of the moving object and a second number of image elements in the first surroundings image for a height and/or a width of the stationary object and determining the image size ratio based on the first number of image elements and the second number of image elements;
            to determine distances of the stationary object at the first time and at the second time and an object size of the stationary object on the basis of the determined image sizes of the stationary object and a vehicle speed; and
            to determine distances of the moving object at the first time and at the second time on the basis of the determined image size ratio, the determined distances and the determined object size of the stationary object.

8. The device of claim 7, wherein the evaluation circuit is further configured to determine an object size of the moving object on the basis of the determined image size ratio and the determined object size of the stationary object; and to determine a further distance of the moving object at a later further time only on the basis of the determined object size and an image size of the moving object determined in a captured third surroundings image.

9. The device of claim 7, wherein the evaluation circuit is further configured to determine a relative speed of the moving object with respect to the motor vehicle on the basis of the determined distances of the moving object and a time difference between the first time and the second time.

10. A motor vehicle comprising at least one device of claim 7.

11. The method of claim 2, comprising determining one or more of the distances and the object size of the stationary object on the basis of predefined optical properties of the camera, wherein the camera comprises a fixed focus optical unit with a predefined image distance.

12. The method of claim 2, wherein the distinguished geometric relationship is defined by at least one contact point of image elements of the moving object and image elements of the stationary object in the first surroundings image.

13. The method of claim 3, wherein the distinguished geometric relationship is defined by at least one contact point of image elements of the moving object and image elements of the stationary object in the first surroundings image.

14. The method of claim 2, comprising determining and providing a relative speed of the moving object with respect to the motor vehicle on the basis of the determined distances of the moving object and a time difference between the first time and the second time.

15. The method of claim 3, comprising determining and providing a relative speed of the moving object with respect to the motor vehicle on the basis of the determined distances of the moving object and a time difference between the first time and the second time.

16. The method of claim 4, comprising determining and providing a relative speed of the moving object with respect to the motor vehicle on the basis of the determined distances of the moving object and a time difference between the first time and the second time.

17. The method of claim 14, comprising determining and providing an absolute speed of the moving object, wherein for this purpose the determined relative speed and a vehicle speed of the motor vehicle are added together.

18. The device of claim 8, wherein the evaluation circuit is further configured to determine a relative speed of the moving object with respect to the motor vehicle on the basis of the determined distances of the moving object and a time difference between the first time and the second time.

19. A motor vehicle comprising at least one device of claim 8.

20. A motor vehicle comprising at least one device of claim 9.

21. A method for camera-based determination of a distance of a moving object in the surroundings of a motor vehicle, comprising:
    capturing a first surroundings image of the surroundings at a first time and a second surroundings image of the surroundings at a subsequent second time using a camera;
    identifying the moving object in the captured surroundings images;
    identifying at least one stationary object in the captured surroundings images and selecting the at least one stationary object according to a distinguished geometric relationship relative to the moving object in the first surroundings image;
    determining an image size ratio between an image size of the moving object and an image size of the stationary object in the first surroundings image;
    determining an image size of the stationary object in the second surroundings image;
    determining distances of the stationary object at the first time and at the second time and an object size of the stationary object on the basis of the determined image sizes of the stationary object and a vehicle speed; and
    determining distances of the moving object at the first time and at the second time on the basis of the determined image size ratio, the determined distances and the determined object size of the stationary object;

determining and providing a relative speed of the moving
object with respect to the motor vehicle on the basis of
the determined distances of the moving object and a
time difference between the first time and the second
time; and
determining and providing an absolute speed of the mov-
ing object, wherein for this purpose the determined
relative speed and a vehicle speed of the motor vehicle
are added together.

* * * * *